United States Patent [19]

Birchak

[11] Patent Number: 4,532,812
[45] Date of Patent: Aug. 6, 1985

[54] PARAMETRIC ACOUSTIC FLOW METER
[75] Inventor: James R. Birchak, Spring, Tex.
[73] Assignee: NL Industries, Inc., New York, N.Y.
[21] Appl. No.: 509,520
[22] Filed: Jun. 30, 1983
[51] Int. Cl.³ .......................... G01F 1/66; E21B 47/00
[52] U.S. Cl. .................................. 73/861.27; 73/155; 73/861.04
[58] Field of Search ........... 73/861.04, 861.05, 861.27, 73/861.28, 861.29, 861.25, 155

[56] References Cited
U.S. PATENT DOCUMENTS

| | | | |
|---|---|---|---|
| 2,290,408 | 7/1942 | Crites | 73/155 |
| 4,003,252 | 1/1977 | Dewath | 73/861.27 |
| 4,004,461 | 1/1977 | Lynnworth | 73/861.27 |
| 4,052,896 | 10/1977 | Lee et al. | 73/861.29 |
| 4,208,906 | 6/1980 | Roberts, Jr. | 73/155 |

Primary Examiner—Charles A. Ruehl
Attorney, Agent, or Firm—Carl O. McClenny; William E. Johnson, Jr.

[57] ABSTRACT

Method and apparatus for measuring the flow velocity of drilling mud returning from the annulus of a borehole. At least two parametric acoustic pulse transducers are longitudinally disposed with respect to a conduit with a pair of acoustic receivers positioned therebetween. The transducers each generate strong, focused acoustic waves comprised of combined dual frequencies directed at the center of the conduit area in which fluid flow is to be measured. The transducers are actuated alternately and produce time variant signals permitting measurement of fluid flow by employing the Doppler effect on the parametric secondary acoustic pulses. The utilization of combined dual frequency acoustic transducers provides a primary signal having sufficient strength to produce a non-linear response in the liquid and produce secondary, low frequency wave propagation directly from within the mud itself. The low frequency waves enhance wave propagation through gas cut muds and enhance signal recognition in the receivers. In this manner, mud flow rate data can be accurately generated in either a downhole or wellhead configuration directly through mud laden with gas and without significant signal loss or conventional axial range limitations.

29 Claims, 7 Drawing Figures

PARAMETRIC ACOUSTIC FLOW METER

BACKGROUND OF THE INVENTION

1. Field of the Invention

The invention relates to a system for measuring the flow velocity of mud returning from the annulus of a borehole and, more particularly, the determination of the velocity of borehole fluid flow by the parametric generation of the difference frequency from combined, dual frequency acoustic signals.

2. History of the Prior Art

It has long been recognized in the oil industry that the collection of downhole data during drilling is of extreme value. Such information not only improves the efficiency of the drilling operation, but may serve as a warning to prevent dangerous situations from arising. A common, ever present danger in the drilling of a borehole is encountering an earth formation which contains high pressure fluids. When this occurs, the high pressure fluids from the formation enter the borehole and displace the drilling mud back up the borehole toward the drilling rig at the surface. If the intrusion of high pressure fluids back into the borehole is not detected quickly and controlled, it can result in the complete displacement of the drilling mud back up the borehole and expulsion of the high pressure fluids out of the top of the borehole. This event is called a "blow out" and can result in great injury to both property and life due to the high combustibility of the natural gas and other fluids and the violence with which they exit from the borehole.

On the other hand, it is possible that, during drilling, a borehole may enter a formation which is highly porous and create a tendency for all of the drilling mud to flow freely from the borehole into the porous formation. This event is termed "lost circulation" and can result in the substantial loss of drilling fluids if the lost circulation is not detected very rapidly and preventive measures taken. Upon the impendence of either of these two events, "blow-out" or "lost circulation", it is desirable to detect them as rapidly as possible in order to take remedial action to control the run-away mud flow and prevent either its substantial loss into a porous formation or to prevent its moving back up the borehole toward the surface and thereby prevent the possibility of personal injury and damage to equipment resulting from that rapid upward movement.

It is known to compare the input mud flow rate with the return mud flow rate in a borehole. A substantial increase in the rate of return mud flow with no corresponding increase in input flow is indicative of a "blow-out" whereas a substantial increase in input mud flow without a corresponding increase in the output flow is indicative of lost circulation. The biggest difficulty with prior art techniques for measuring these changes in mud flow rates has been that it has only been possible to make such measurements near the surface end of the borehole. Therefore in a deep borehole it was only possible to detect the imminence of "blow-out" at a location which is quite remote from the location down in the borehole where the event actually occurred. Thus, substantial amounts of time may have elapsed prior to the detection at the surface of the occurrence of an event downhole and substantial damage may have also occurred before remedial action could be taken.

The prior art is replete with techniques for monitoring the rate of mud flow returning from the annulus of a borehole. In recent years, systems which permit "measuring-while-drilling", which involves obtaining information continuously during drilling operations, have been favored. Among such systems, a number of different approaches exist for the critical step of continuously sensing and measuring the motion of the downhole fluids. A particular subset of these approaches has given rise to devices which sense the fluid motion by means of propagating acoustic energy through the fluid. In general, the physics of the measurement approach itself characterizes the different types of devices: Doppler shift, propagation time, and phase shift effects have each been used successfully to measure drilling fluid flow rates. Doppler devices utilize the frequency shift of the acoustic energy directed in the same direction as the flow relative to the acoustic energy directed in the opposite direction of the flow as the measure of fluid velocity. Such systems require the utilization of acoustic pulse generators which are operable in a downhole environment and which produce the necessary amplitude and frequency signal to overcome the technical problems associated with transmitting acoustic pulses in the hostile environment of a borehole.

A myriad of prior art problems plague flow velocity measurement devices which employ conventional acoustic pulse sensor systems. A primary source of concern is the generation of a "recognizable" acoustic signal without interfering with the flow of drilling fluid. The placement of a transmitter and a receiver directly in the borehole annulus effectively produces a recognizable signal but positioning a transducer structure in the path of fluid flow has serious and undesirable side effects. It is an advantage, therefore, to position the acoustic transmitter and receiver upon the conduit conducting the flow, however, this causes other problems. First, low frequency acoustic pulses are the ones which are most readily propagated in the drilling mud but the transducer hardware necessary to generate strong low frequency signals is generally too large for downhole applications. Secondly, the speed of sound in steel is approximately five times that in drilling fluid and the critical axial component of the acoustic energy is carried much more readily by the conduit than it is by the drilling mud. Higher frequency acoustic pulses will have smaller conduit components, but such signals have limited axial range because the cuttings entrained in the mud reflect and attenuate the signal. Often times the scattering loss is so severe with conventional ultrasonic flow measurement systems that the axial signal component is lost completely.

The system of the present invention overcomes many of the disadvantages of the prior art by making the measurement of downhole mud flow rates by low frequency acoustic signals propagated directly from within the fluid flow. The generation of such low frequency pulses was, heretofore, not generally thought to be feasible in downhole configurations due to the requisite size of the pulse generation unit.

Although more modern prior art approaches have included ultrasonic pulse generation systems which function with relatively small transducer structures, such ultrasonic flow devices do not provide satisfactory results in gas cut muds because the wall signals in the conduit greatly exceed the signals produced in the fluid. The present invention overcomes this particular difficulty by generating a low frequency pulse in the liquid where the two higher frequency, ultrasonic waves overlap. High frequency transducers having a frequency bandwidth typically of 500 KMz to 1 MHz are disposed upon the outside of the conduit to generate a strong, focused wave at the center of the fluid flow to be measured. The transmitter transducers are pulsed with a dual frequency wave of sufficient strength to generate nonlinear response of a non-gaseous liquid or to interact with existing or cavitated gas in the fluid, thereby generating a secondary (parametric) pulse of "difference frequency" waves in the fluid itself. The two different frequencies of the dual frequency signal are selected so that the secondary difference frequency pulse is at a low frequency having the appropriate attenuation characteristics and axial energy component to axially propagate to the receiver. A simple configuration has a pair of broadband transducers can be used, first transmitting and receiving a low frequency signal upstream and then downstream. The differences in sound speed can be used to derive flow velocity. In this manner, low frequency, high amplitude acoustic waves are generated directly in the mud with small transducers suitable for downhole use.

SUMMARY OF THE INVENTION

The present invention relates to a method and apparatus for measuring the velocity of fluid flow in a conduit. More particularly, one aspect of the present invention includes apparatus for measuring fluid flow in a conduit comprising first and second parametric acoustic pulse generation transducers and receivers longitudinally disposed relative to the conduit. The pulse generation units produce a primary signal comprising a pair or different high frequency waves overlapping in the center of the conduit area. Interaction of this dual frequency acoustic energy in a fluid having nonlinear response generates a secondary acoustic pulse which propagates in the fluid to the receiver at the difference frequency. Similar apparatus also applies to the problem of monitoring the mud flow in a borehole annulus.

In yet another aspect, the invention includes apparatus for measuring the velocity of fluid flow in a select region of a conduit by the utilization of acoustic pulses propagated therein. The apparatus comprises first and second acoustic pulse generating transducers longitudinally disposed on the conduit. Means are provided for receiving the acoustic pulses propagated in the fluid. The means are longitudinally disposed on the conduit relative to the transducers. The transducers also include means for producing combined, dual frequency, primary acoustic pulses and means for directing the primary pulses toward the select region of the conduit for generation of a secondary acoustic pulse at a frequency equal to the frequency difference between the two primary frequencies. The secondary pulse is generated within the fluid and is propagated axially therefrom to the receivers.

The means for directing the primary pulses also includes an acoustic pulse transmitter adapted for generating a collimated pulse through the conduit toward the select region thereof. The apparatus may include a plurality of acoustic pulse generation transducers disposed circumferentially about the conduit adapted for generating a focused pulse toward the center. Means may also be disposed between the transducer and the receiver for attenuating the acoustic pulse propagated within the conduit for improving return signal recognition.

In yet another embodiment, a method is provided for measuring the flow of fluid in a conduit utilizing Doppler shift principles. The method comprises the steps of providing first and second acoustic pulse generators upon the conduit longitudinally disposed, one from the other. First and second acoustic pulse receivers are provided upon the conduit. The receivers may comprise a part of the separate pulse generators. Primary acoustic waves comprising combined, dual frequency pulses are alternately generated with the first and second pulse generators and directed into the fluid flowing in the conduit. Secondary acoustic waves are then generated within the fluid of the conduit from the primary acoustic pulses at the difference frequency. The primary waves are thus provided with sufficient strength to cause the secondary waves to propagate axially to the first and second acoustic pulse receivers. The pulse propagation time between the pulse generators and the receivers is then detected and fluid flow determined from Doppler shift principles thereof. The step of generating primary acoustic waves of sufficient strength includes the step of focusing the combined, dual frequency, primary pulse to a select point in the fluid to be measured. The combined, dual frequency pulse may comprise having frequencies between 0.5 and 1 MHz with the secondary acoustic pulse generated at a frequency on the order of 0.2 MHz.

In yet another aspect, the invention includes apparatus for measuring the velocity of fluid flow in a select region of a conduit by the utilization of acoustic pulses and the Doppler shift principle therein. The apparatus includes a housing adapted to be inserted within the conduit and acoustic pulse generating transducers longitudinally disposed upon the housing. The generators are oriented for directing an acoustic pulse outwardly into the annular region. Means are provided for receiving the acoustic pulses and are longitudinally disposed upon the housing. The transducers include means for producing combined, dual frequency, primary acoustic pulses. Means are also provided for directing the primary, dual frequency, acoustic pulses toward the fluid in the annular region around the housing for generation of secondary acoustic pulses within the fluid and the wave propagation axially therefrom to the receivers. The means for directing the primary pulses includes an acoustic pulse transmitter adapted for generating a collimated pulse outwardly of the housing in a focused configuration toward the annular region therearound.

In yet a further aspect, the invention includes an improved method of measuring the flow of fluid in a conduit utilizing the Doppler shift principle. The method includes the steps of providing a housing for positioning within the conduit and securing first and second acoustic pulse generators adapted for generating primary acoustic waves comprising combined, dual frequency pulses thereto. The first and second acoustic pulse generators are longitudinally disposed, one from the other upon the housing. First and second acoustic pulse receivers adapted for detecting acoustic pulses propagating within the fluid are mounted to the housing relative to the transducers. Alternately generated primary acoustic waves are produced with the generators and directed into the fluid flowing around the housing. Secondary acoustic waves are then generated within the fluid of the conduit from the primary acoustic pulses. The primary waves are of sufficient strength to cause the secondary waves to propagate axially to the first and second acoustic pulse receivers. The pulse propagation between the pulse generators and the receivers is then detected and fluid flow rate is determined from the Doppler shift principle.

BRIEF DESCRIPTION OF THE DRAWINGS

For a more complete understanding of the present invention and for further objects and advantages thereof, reference may now be had to the following description taken in conjunction with the accompanying drawing in which.

DETAILED DESCRIPTION OF THE PREFERRED EMBODIMENT

Figure 1:
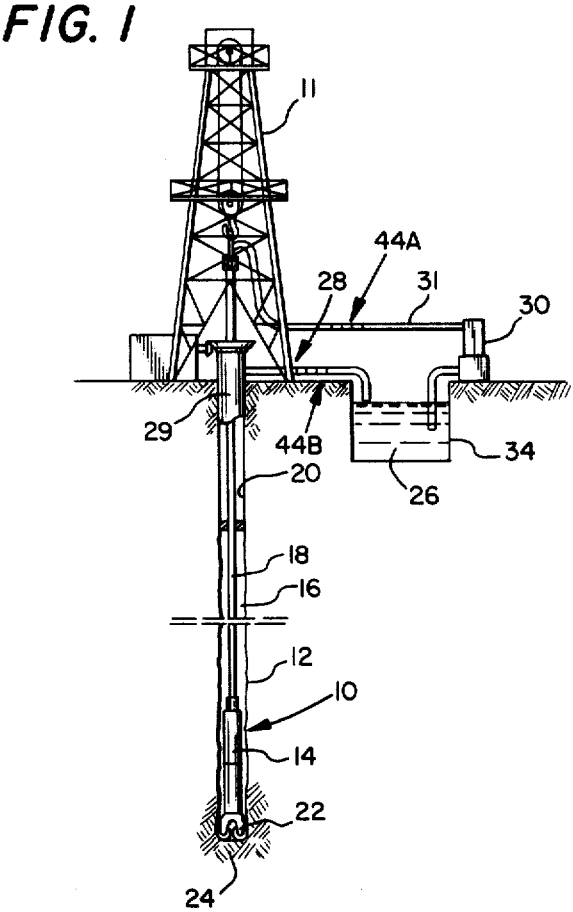
FIG. 1 is a diagramatic, side-elevational view of a borehole drilling operation illustrating the measurement of the flow of drilling mud in accordance with the principles of the present invention.

Referring first to FIG. 1, there is shown a drilling rig 11 disposed atop a borehole 12. A first embodiment of an acoustic flow meter system 10 constructed in accordance with the present invention is carried by a sub 14 incorporated into a drill string 18 and disposed within a borehole 12. The system 10 is provided for the continuous measurement of mud flowing within the annular regions 16 defined between the drill string 18 and the borehole sidewalls 20. A drill bit 22 is located at the lower end of the drill string 18 and carves the borehole 12 through the earth formations 24. Drilling mud 26 is pumped from a storage pit 26 near the wellhead 28, down an oval opening in the drill string 18, out of apertures in the bit 22 and back to the surface through the annular region 16. Metal casing 29 is positioned in the borehole 12 above the drill bit 22 for maintaining the integrity of the upper portion of the borehole 12.

The annulus 16 between the drill stem 18 and the sidewalls 20 of the borehole 12 forms the return for the drilling mud flow path. Mud is pumped from the storage reservoir 34 near the wellhead 28 by a pumping system 30 through a mud supply line 31 which is coupled to a central passageway extending throughout the length of the drill string 18. Drilling mud is, in this manner, forced down the drill string 18 and exits into the borehole through apertures in the drill bit 22 for cooling and lubricating the bit and carrying the formation cuttings produced during drilling operation back to the surface. An exhaust conduit 32 is connected from the annular passageway 6 at the wellhead for conducting the return mud flow from the borehole 18 to the storage reservoir 34 as shown in FIG. 1. The drilling mud is typically handled and treated by various apparatus (not shown) such as outgassing units and circulation tanks for maintaining a pre-selected mud viscosity and consistency.

The relative flow of drilling fluids going downhole through the mud supply line 31 and the return mud flow through the mud exhaust conduit 32 and the borehole annulus 16 is substantially equal under normal drilling conditions. However, for the anomalous drilling conditions described above, such as blowout and lost circulation, the relative mass flow rates into the borehole and out of the borehole are appreciably different. Input and output drilling fluid mass flow rates are continuously measured and compared during the drilling operation in accordance with the principles of the present invention for purposes of evaluating the operation and detecting the onset of anomalous conditions. The downhole sub 14 incorporating the systems of the invention provides parametric acoustic transducers and receivers in coupled relationship as a means for accurately making mass flow measurements at a location immediately adjacent the drill bit 22 for early detection of a variation in drilling fluid flow.

Still referring to FIG. 1, there is shown the parametric acoustic pulse flow meter system 10 of the present invention in a downhole environment in sub 14 and equivalent flow meter systems 44A in the mud supply line 31 and 44B in the mud return line 32. The system 10 is constructed to generate a primary high frequency signal comprised of a pair of different frequencies. These acoustic pulses are radiated in a focused configuration in both mud flow environments to effectively provide an accurate measurement of flow as will be described below. In the present illustration, the transducers and receivers of the downhole system 10 in sub 14 and the surface system 44 (44A and 44B) are shown in a diagrammatic form for purposes of illustration only. Moreover, the requisite telemetry and communication systems for transmitting flow data from downhole during drilling operations may be of conventional design and are not specifically shown.

Figure 2:
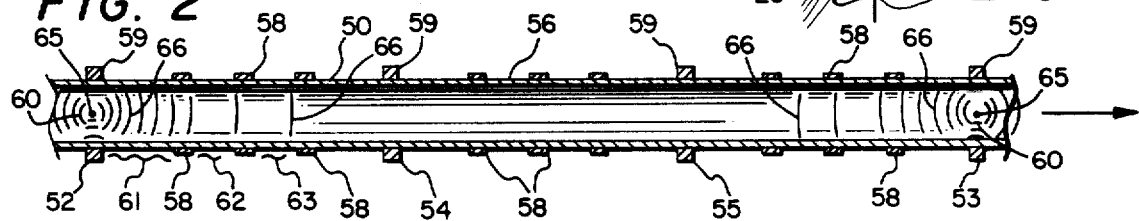
FIG. 2 is a side-elevational, schematic diagram of one embodiment of the present invention incorporating means for attenuating acoustic wave propagation in the conduit.

Referring now to FIG. 2, there is shown an enlarged, side-elevational schematic view of one embodiment of the parametric acoustic flow meter system 44 constructed in accordance with the principles of the present invention. The system 44 is mounted to conduit 50 through which the subject fluid 26 to be measured passes. The conduit 50 of FIG. 2 may, for example, comprise either the mud supply line 31 or the mud return line 32. The system 44 comprises a pair of acoustic transducers 52 and 53, each of which is capable of simultaneously emitting acoustic signals comprising a pair of high frequency pulses of different frequency preferably in the range of 500 KHz to 1 MHz, although other ranges are possible. The transducers 52 and 53 are longitudinally disposed upon the pipe 50 and secured thereto for imparting the dual frequency acoustic waveforms into the flowing mud 26 stream within which a secondary acoustic signal is generated as will be discussed below. A pair of receivers 54 and 55 are mounted to the conduit 50 between the transmitting transducers 52 and 53 for receiving the secondary signal produced and propagated axially through the fluid 26.

As shown in FIG. 2, there is illustrated one embodiment of means for attenuating the acoustic wave propagating within sidewalls 56 of the conduit 50. The means shown in this particular embodiment comprise annular mass loading rings 58 secured to the conduit wall 56. These attenuation rings 58 may be selectively positioned upon the conduit 50 at distances proportional to the frequency and wave lengths of the acoustic signals being used. In this manner, the axial components of the acoustic pulses carried by the conduit wall 56 may be attenuated to advantageously reduce the signal level of the interference present at the receivers 54 and 55. It may further be noted that the transducers 52 and 53 and receivers 54 and 55 are also shown to be removably clamped to the outside of the conduit 50 by clamped rings 59.

In FIG. 2, there is also diagrammatically shown the acoustic energy waveforms illustrative of the operation of the present invention. Transducers 52 and 53 and receivers 54 and 55 are referred to herein individually for purposes of clarity but it should be noted that a plurality of transmitters and/or receivers and combinations thereof may be combined into single transducers and as will be set forth in more detail below. The transducers 52 and 53 are also referred to as "parametric" transducers. The term "parametric" is used herein to define a pair of acoustic signals each of which is of different frequency with a preselected frequency difference therebetween and a transducer capable of producing those combined, dual frequencies during pulse generation. The frequencies of the parametric transducer are selected for generating minimum conduit components during passage of the signal through the wall 56 of the flow confining conduit 50. The dual frequency acoustic pulse is illustrated by waveform 60 and is generated in a collimated, focused configuration directed toward the axial center of the region of the conduit 50 where flow measurement is to be made. The dual frequency wave form 60 illustrated in FIG. 2 is shown in a radially inwardly focused configuration, although some propagation of the pulse will naturally occur in the axial direction through the conduit walls 56. This propagation is represented by waveforms 61, 62 and 63 along wall 56. As set forth above, the axial wave propagation is damped by the attenuation rings 58. From the initially introduced vibration 61, the rings produce an attentuated wave 62 and a further attentuated wave 63 diagrammatically represented in the figure.

Figure 5:
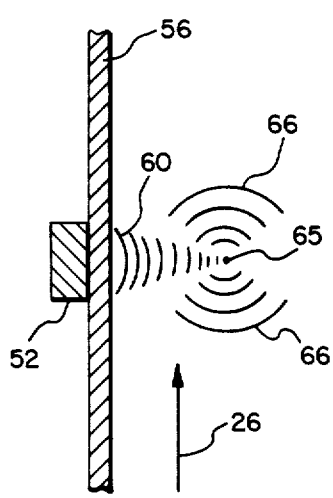
FIG. 5 is an enlarged, diagramatic illustration of the transducer wave propagation of the embodiment of the invention shown in FIG. 2.

Referring now to FIG. 5, there is shown an enlarged, diagrammatic view illustrating the transducer 52 and the primary and secondary waveforms. The dual frequency acoustic waveform 60 terminating in the center of the fluid flow 26 creates a zone of intense acoustic energy 65 that is absorbed by the segment of fluid 26 exposed to the energy path. The intensity of this focused acoustic energy will cause nonlinear response in the fluid. The primary acoustic energy 60 then results in resonation in the fluid, in the cavitated bubbles and in any entrained gas already in the liquid 26 and present in the zone 65 of focused energy. The effect that occurs in the fluid 26 is related to the nonlinear response characteristics that are associated with fluid entrained gas bubbles. Specifically, the impingement of dual frequency acoustic upon liquid, upon entrained gas bubbles within the liquid, or upon bubbles produced by the cavitation of the fluid produces an in situ generation of acoustic energy at the "difference frequency" due to the nonlinear resonation response of the fluid. This difference frequency is selected to be substantially less than either of the individual frequencies comprising the dual frequency waveform 60 and behaves as though it were a discrete, secondary acoustic pulse source. The secondary acoustic waveform is thus propagated directly from the zone of energy absorption 65 producing an omni-directional waveform 66 of sufficiently low frequency, for example on the order of 0.1 to 0.2 MHz, for effective propagation in a typical borehole mud. The secondary pulse 66 thus propagates axially to the select receiver 54 or 55, as shown in FIG. 2. The secondary wave propagation is, of course, effected by the Doppler shift effect producing a response time and frequency which is a function of the direction and rate of fluid flow.

In operation of the system of the invention, the primary pulse waves are generated by super-imposing combined, dual frequencies $F_1$ and $F_2$ on the transducers or transmitters. The resulting wave at the difference frequency $(F_1-F_2)$ comprising the secondary acoustic pulse becomes the only critical signal propagating between the receivers. As is conventional in Doppler shift calculation, the pulse waves propagating against the fluid flow are retarded and the pulse waves travelling with the fluid flow are speeded up. The flow velocity of the fluid can be derived by conventional techniques from the respective propagation times between the receivers. It should also be noted that, in certain embodiments, the transducers, themselves, may be utilized in the configuration of transceivers employing both transmitter and receiver elements whereby each may receive the wave forms generated by the other and eliminate the need for separate receivers.

The effective operation of the combined dual frequency, or parametric acoustic transducers of the present invention may be readily appreciated by comparison with the disadvantages of the prior art recited above. The use of either high or low frequency acoustic pulses, individually, has severe technical limitations. The present invention utilizes the advantages of high frequency waves 60 to efficiently penetrate the conduit 50 in a collimated form with smaller conduit components. The collimated waveform 60, when absorbed by the region of the fluid 26 to be measured, produces a secondary pulse generation point for initiation of the desired low frequency wave front 66. The generation of the low frequency acoustic wave 66 from resonation of the fluid 26 provides the most direct manner of determining fluid flow by Doppler shift without the intrusion of a discrete transducer into that portion of the fluid itself. The receivers 54 and 55 may thus be connected to conventional discrimination circuits for distinguishing the distinctive low frequency pulse 66 as separated from the various other higher frequencies propagating along the conduit walls 56 as shear waves and within the fluid medium 26 as longitudinal waves. Because different dual high frequency combinations generate ceratin difference frequency acoustic pulses, various dual frequency pairs can be selectively varied to tune the frequency of the secondary pulse 66 to the particular applications and fluid consistencies.

Figure 3:
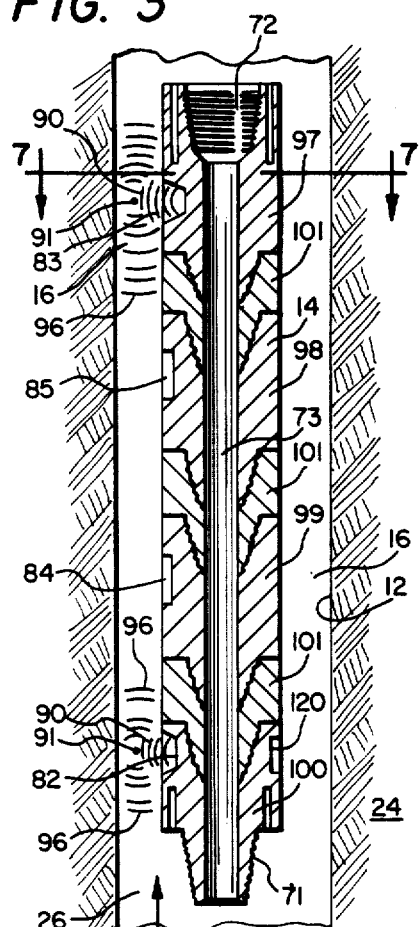
FIG. 3 is an enlarged side-elevational cross-sectional view of a downhole sub for fluid measurement constructed in accordance with the principles of the present invention.

Referring now to FIG. 3, there is shown the downhole sub 14 incorporating the system 10 for in situ measurement of the mass flow of drilling mud 26 within the annulus 16 of the borehole 12. The sub 14 is generally cylindrical and includes a pin end 71 and a box end 72 for mounting the sub co-axially within a string of drill pipe. A cylindrical axial passage 73 extends through the sub 14 to allow passage of incoming drilling fluid 26 from the surface down the drill string 18 toward the drill bit 22. The outgoing drilling flow returns back up the annulus 16 along the outside wall of the sub 14 which forms the inner surface of the annulus 16. The sub 14 of the present invention is constructed with a number of cavities formed therein for receiving various electronic components forming portions of the present invention which are located downhole. For example, parametric transducers 82 and 83 are located on opposite ends of the sub 14 with receivers 84 and 85 disposed inwardly of the transducers in the manner described above. It should be understood that the illustration of the transducers 82 and 83 and receivers 84 and 85 in the drawing are merely diagrammatic and various physical arrangements of transducer and receiver mounting configurations may be used. Moreover, a plurality of transducers and receivers may be utilized in a circumferential mounting configuration about the sub 14 as will be described in more detail below.

Figure 7:
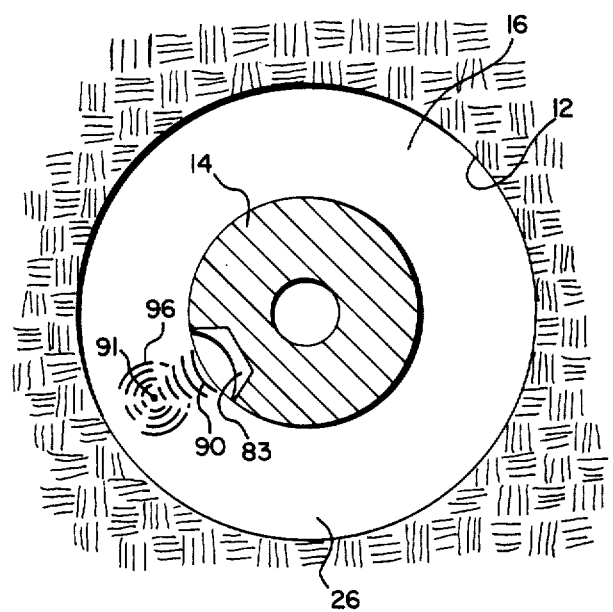
FIG. 7 is an enlarged, diagramatic, top plan view of a section of the sub of FIG. 3 taken along lines 7—7 thereof.

Referring now to FIGS. 3 and 7 in combination, the transducers 82 and 83 are constructed for focusing dual high frequency acoustic pulses outwardly from the sub 14 toward a focal point in the annulus 26, preferably intermediate between the sub 14 and the borehole 12. The focal point of the acoustic energy should be a distance sufficiently spaced from the sub 14 to permit accurate flow readings of the fluid 26 passing upwardly. As shown most clearly in the top plan view of FIG. 7, a primary dual frequency waveform 90 is radiated in a collimated, focused pattern into the fluid 26. At the focal point 91, the fluid 26 absorbs the concentrated high frequency acoustic energy providing a nonlinear response and which may result in cavitation of the fluid and resonation of this energy within gas bubbles formed by cavitation therein and those already entrained in the fluid. As stated above, the resonation produces a difference frequency, having a substantially lower frequency than either of the primary frequencies, which propagates omni-directionally therefrom as wavefront 96. The secondary pulse 96 thus propagates through the fluid 26 in the axial direction of the borehole to the respective receiver 84 or 85 shown in FIG. 3. The receivers 84 and 85 are tuned to detect the selectively generated secondary pulse frequency.

The propagation of the primary and secondary acoustic pulses of the present invention affords a means for detecting fluid flow by conventional utilization of the Doppler shift techniques. This established principle of flow measurement is utilized in the present invention by pulsing the transducers 82 and 83, or 52 and 53, alternately. The difference in time for the respective receivers to receive the secondary pulses propagated in the same direction as the flow and in the opposite direction as the flow velocity of the fluid flow is due to the Doppler shift. For example in FIG. 3, the time it takes for a pulse 96 to travel between transducer 82 and receiver 84 will be less than the time for a pulse 96 to travel the same distance between transducer 83 and receiver 85 with mud 26 flowing upwardly as shown.

Figure 6:
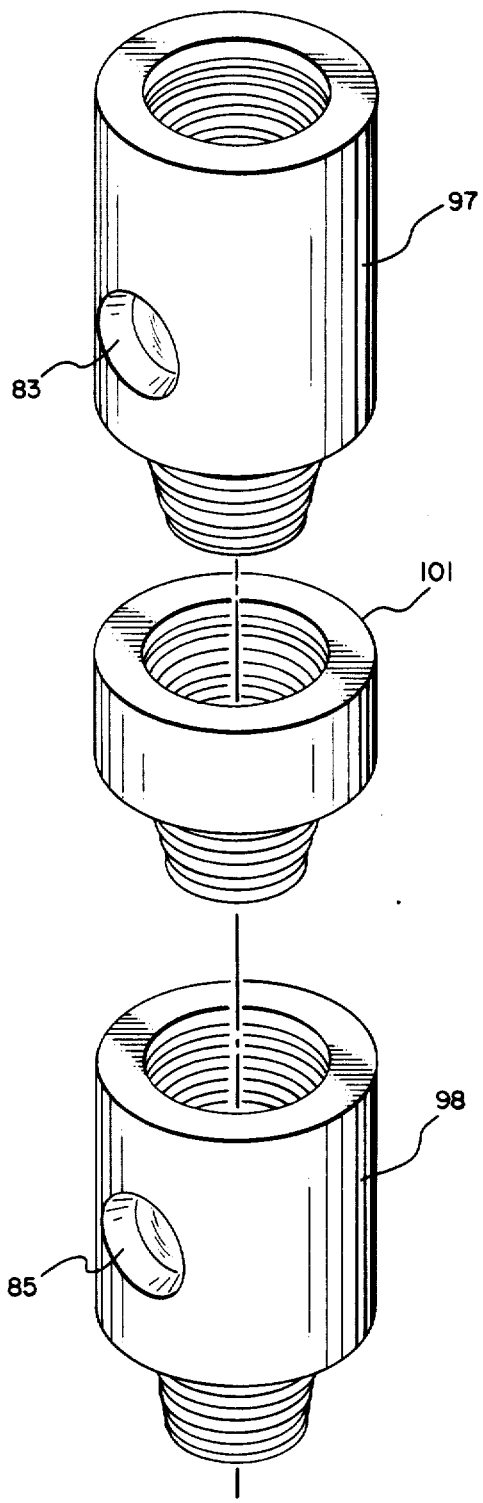
FIG. 6 is an enlarged, diagramatic, exploded, perspective view of the upper sections of the downhole sub of FIG. 3 illustrating one embodiment of the assembly thereof.

Referring now to FIGS. 3 and 6, there is diagrammatically shown a sectioning of the sub 14 into steel sections 97, 98, 99, and 100. Each steel section is separated by a dampening section 101 of a different acoustic impedance than steel for framing acoustic discontinuation at the interfaces and reducing the axial propagation of the primary and/or secondary acoustic pulses along the sub 14. Such an alternative method of pulse attenuation is shown diagrammatically in FIG. 3 and in fragmentary, enlarged, exploded, perspective in FIG. 6. It should be noted that the sub 14 may also incorporate an attenuation ring approach as illustrated in FIG. 2 in lieu of the "sectioned" attenuation design of FIGS. 3 and 6. Attenuation rings may, for example, be provided in the sub 14 by the formation of circumferential grooves or similar methods. It should be noted that, in general, various attenuation techniques may or may not be utilized in either the conduit or sub embodiments without departing from the spirit and scope of the present invention.

Figure 4:
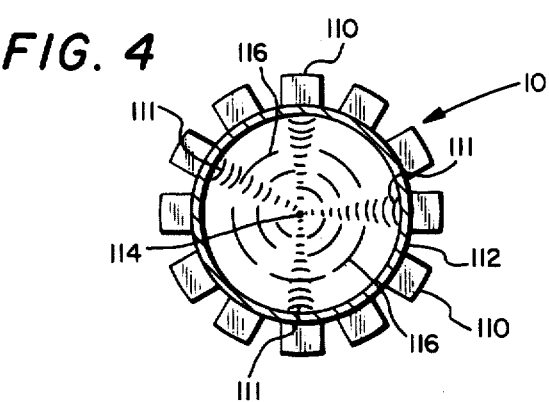
FIG. 4 is a top plan, schematic view, of an alternative embodiment of the present invention illustrating a plurality of acoustic transducers symmetrically disposed about a flow conduit.

Referring now to FIG. 4, there is shown a top plan view of yet another alternative embodiment of the present invention. The flow meter system of FIG. 4 illustrates the positioning of a plurality of transducers 110 around a conduit 112. The conduit 112 may be one of those located near the wellhead such as the mud supply line 31 or the return line 32. Such an embodiment may be seen to provide very accurate measurements of flow velocity of drilling mud returning from the annulus of a borehole 12. The transmitter configuration of FIG. 4 may be used to generate an extremely strong secondary pulse at the center of the conduit 112. The transducers 110 are pulsed simultaneously with combined dual frequency waves 111 focused toward the center 114 of the conduit 112. In the region of zone 114, cavitation may occur as the acoustic energy interacts with the nonlinear response of the fluid and entrained gas bubbles. Nonlinear resonation within the fluid generates difference frequency waves comprising the secondary wave front 116 as set forth above. As herein set forth, the difference frequency signal is selected to have a frequency with the appropriate attenuation characteristics to facilitate propagation axially to the appropriate receiver. The presence of absorptive mass loading devices positioned outwardly of the conduit 112 and longitudinally disposed from the transducers 110 reduce the secondary signal as well as the primary signal conducted by the wall 112, as discussed above in connection with the mass loading devices of FIG. 2.

It has been shown that the various downhole embodiments of the system of the present invention provide enhanced signal recognition and signal generation efficiency in drilling muds, especially those containing entrained gases. The approach of focusing the primary pulse permits selection of the location for initiation of propagation of the secondary pulses to maximize back signal recognition and axial propagation. For example as shown in FIG. 3, a parametric acoustic transducer comprising an ultrasonic depth gauge 120 employing the techniques of the invention may be mounted at the bottom of sub 14 to monitor the liquid depth in the borehole 12.

It should also be noted that in another embodiment of the present invention, parametric transducers may be mounted upon the wall of the casing 29. In this configuration, the transducers must be located below the return conduit 32 to induce the acoustic signals in the liquids.

The foregoing description of the invention has been directed primarily to a particular preferred embodiment in accordance with the requirements of the patent statutes and for purposes of explanation and illustration. It will be apparent, however, to those skilled in the art that many modifications and changes in the specifically described and illustrated apparatus and method may be made without departing from the scope and spirit of the invention. Therefore, the invention is not restricted to the particular form of construction illustrated and described, but covers all modifications which may fall within the scope of the following claims.

It is the Applicant's intention in the following claims to cover such modifications and variations as fall within the true spirit and scope of the invention.

What is claimed is:

1. Apparatus for measuring the velocity of a fluid flowing along a select region of a conduit by the utilization of acoustic pulses and application of the Doppler principle, said apparatus comprising:

transducer means comprising first and second acoustic pulse generation transducers longitudinally disposed on said conduit for producing combined dual frequency, primary acoustic pulses;

receiver means for receiving and detecting secondary acoustic pulses propagated in said fluid, said receiver means being longitudinally disposed on said conduit and longitudinally spaced relative to said transducers; and means for directing said primary, dual frequency acoustic pulses toward a select region adjacent the walls of said conduit for generation of said secondary acoustic pulse within said fluid at the difference frequency between said primary pulses, said secondary pulses propagating axially from said region to said receiver means for determination of fluid flow velocity.

2. The apparatus as set forth in claim 1 wherein said means for directing said primary pulses includes an acoustic pulse transducer adapted for generating a collimated pulse toward the select region.

3. The apparatus as set forth in claim 1 wherein said apparatus includes means disposed between said transducer means and said receiver means for attenuating acoustic pulses propagated within said conduit.

4. The apparatus as set forth in claim 3 wherein said means for attenuating said pulses in said conduit includes a ring secured to said conduit between said transducer means and said receiver means, said ring being adapted for absorbing acoustic energy propagated through said conduit walls.

5. The apparatus as set forth in claim 1 wherein the frequency of both of said primary acoustic pulses is in the range between 500 KHz and 1 MHz.

6. The apparatus as set forth in claim 5 wherein the difference between the frequencies of said primary acoustic pulses lies in the range between 100 KHz and 200 KHz.

7. The apparatus as set forth in claim 1 wherein the conduit is a sub connected as part of the drill string of a drilling rig and said select region lies in the annular region between the sub and the walls of the borehole surrounding the drill string.

8. The apparatus as set forth in claim 1 wherein said receiver means includes a pair of acoustic receivers spaced from one another and positioned on the conduit between the first and second pulse generation transducers.

9. A method of measuring the flow of fluid along a conduit by utilizing Doppler shift principles comprising the steps of:

providing first and second acoustic pulse generators upon said conduit disposed longitudinally one from the other;

providing first and second acoustic pulse receivers upon said conduit;

alternately generating primary acoustic pulses comprising combined pulses having two different frequencies with said first and second pulse generators and directing said primary pulses into the fluid flowing along said conduit;

generating secondary acoustic pulses within said fluid of said conduit from the primary acoustic pulses having a frequency equal to the frequency difference between the primary pulses, said primary pulses being of sufficient strength to cause said secondary pulses to propagate axially to said first and second acoustic pulse receivers; and detecting the pulse propagation between said pulse generators and said receivers and determining fluid flow rate from the Doppler shift thereof.

10. The method as set forth in claim 9 wherein said step of generating primary acoustic pulses of sufficient strength includes the step of focusing said combined, dual primary frequency pulses to concentrate the energy at a point in the fluid to be measured.

11. The method as set forth in claim 9 wherein said step of providing first and second pulse generators upon said conduit includes the step of providing first and second spaced sets of pulse generator arrays circumferentially spaced around said conduit.

12. The method as set forth in claim 9 wherein the step of generating said primary acoustic pulses includes generating a combined, dual frequency pulse comprising a pair of pulses each having frequencies in the range between 0.5 MHz and 1 MHz.

13. The method as set forth in claim 9 wherein said secondary acoustic pulses are generated at a frequency in the range between 0.1 MHz and 0.2 MHz.

14. The method as set forth in claim 9 which also includes the step of providing means for attenuating said primary pulses in the walls of said conduit.

15. The method as set forth in claim 14 wherein said means for attenuating said pulses in said conduit walls includes the step of providing mass loads adapted for securement to the sidewall of said conduit and securing said mass loads thereto for damping acoustic pulse propagation therealong.

16. The method as set forth in claim 9 wherein the conduit is a sub connected as part of the drill string of a drilling rig and the primary pulses are directed into the fluid flowing in the annular region between the sub and the walls of the borehole surrounding the drill string.

17. The method as set forth in claim 16 which includes the additional step of:

providing a sub body having a plurality of sections joined longitudinally to one another, alternate ones of the sections being formed of material of different acoustic impedance.

18. Apparatus for measuring the velocity of fluid flow through a select region of a conduit by the utilization of acoustic pulses and the Doppler shift principle, comprising:

a housing adapted to be inserted within said conduit and defining an annular region therearound;

first and second acoustic pulse generating transducers longitudinally disposed upon said housing and oriented for directing acoustic pulses outwardly into said annular region therearound;

receiver means for receiving acoustic pulses, said receiver means being longitudinaly disposed upon said housing relative to said transducers;

said transducers including means for producing combined, dual frequency, primary acoustic pulses; and means for directing said primary, dual frequency, acoustic pulses toward said fluid in said annular region around said housing for generation of secondary acoustic pulses within said fluid having a frequency equal to the frequency difference between the dual frequency pulses, said secondary pulses propagating in an axial direction along the housing to said receiver means.

19. The apparatus as set forth in claim 18 wherein said means for directing said primary pulses includes an acoustic pulse transducer adapted for generating a collimated pulse outwardly of said housing in a focused configuration toward said annular region therearound.

20. The apparatus as set forth in claim 18 wherein said apparatus includes means disposed between said transducers and said receiver means for attenuating acoustic pulses propagated within said housing.

21. The apparatus as set forth in claim 20 wherein said means for attenuating said pulses in said housing includes sections in said housing disposed between said transducers adapted for dampening the propagation of acoustic energy therethrough.

22. The apparatus of claim 21 wherein alternate ones of said sections are comprised of materials having different acoustic impedances.

23. The apparatus of claim 18 wherein the frequency of both of said combined dual frequency pules is in the range of 500 KHz and 1 MHz.

24. The apparatus of claim 23 wherein the frequency difference between said combined dual frequency pulses is in the range of 100 KHz to 200 KHz.

25. The apparatus of claim 18 wherein the frequency difference between said combined dual frequency pulses is in the range of 100 KHz to 200 KHz.

26. The apparatus of claim 18 whereby said housing is a sub adapted for connection as part of the drill string of a drilling rig and the conduit is the borehole surrounding the drill string.

27. An improved method of measuring the flow of fluid in a conduit of the type utilizing the Doppler shift principle and acoustic transducers, said method comprising the steps of:
providing a housing for positioning within said conduit;
providing first and second acoustic pulse generators adapted for generating primary acoustic pulses comprising combined dual frequency pulses;
mounting said first and second acoustic pulse generators upon said housing longitudinally disposed, one from the other;
providing first and second acoustic pulse receivers adapted for detecting acoustic pulses propagating within said fluid;
alternatively generating primary acoustic pulses with said generators and directing said primary pulses into said fluid flowing around said housing;
generating secondary acoustic pulses within said fluid from said primary acoustic pulses, said secondary pulses having a frequency equal to the difference in frequency between the dual frequencies of said primary pulses, said primary pulses being of sufficient strength to permit said secondary pulses to propagate axially in said conduit to said first and second acoustic pulse receivers; and
detecting the pulse propagation between said pulse generators and said pulse receivers and determining fluid flow from the Doppler shift thereof.

28. The method as set forth in claim 27 wherein said step of generating primary acoustic pulses includes the step of:
generating a pair of acoustic pulses each having a frequency between 500 KHz and 1 MHz.

29. The method as set forth in claim 27 wherein said step of generating primary acoustic pulses includes the step of:
generating a pair of acoustic pulses having a frequency difference between them in the range of 100 KHz to 200 KHz.

* * * * *